W. H. KELLY.
FEEDING MECHANISM FOR NUT BLANCHING MACHINES.
APPLICATION FILED DEC. 11, 1914.
1,190,554.
Patented July 11, 1916.
3 SHEETS—SHEET 3.
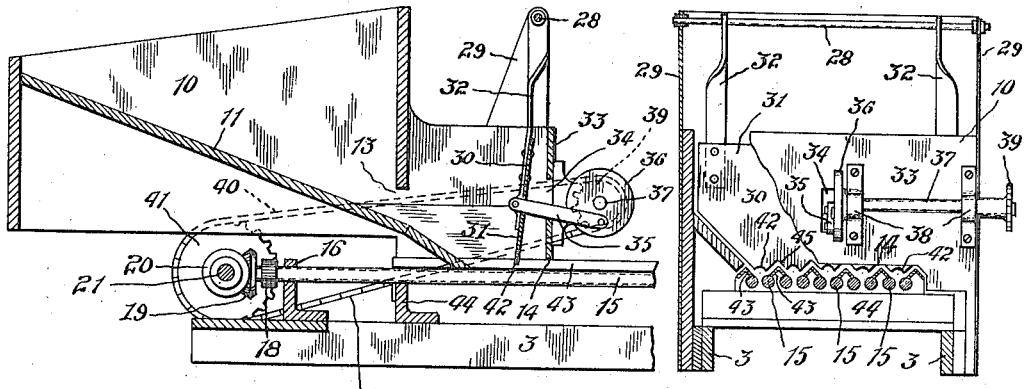
Fig. 4.   Fig. 5.
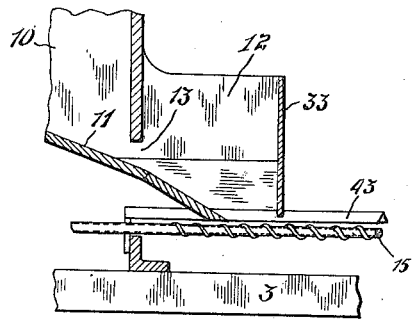 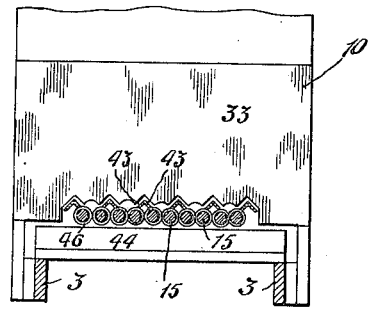
Fig. 6.   Fig. 7.
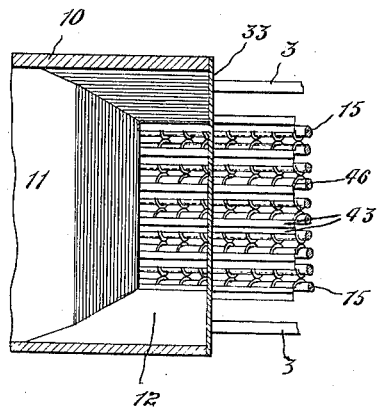
Fig. 8.
Witnesses:
Herman Eisele
D. Findling
Inventor:
William H. Kelly
by A. C. Meskel,
his Attorney

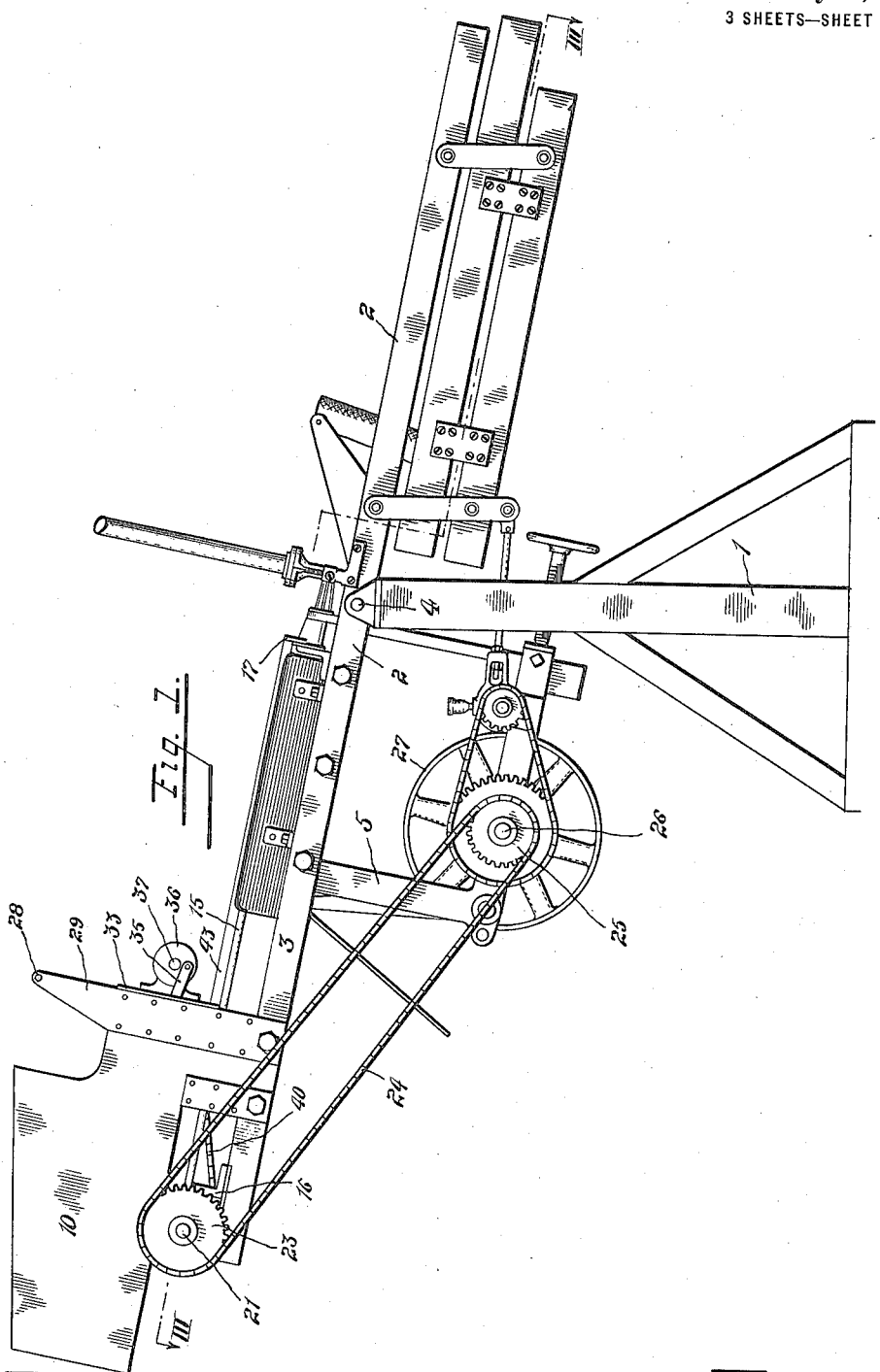

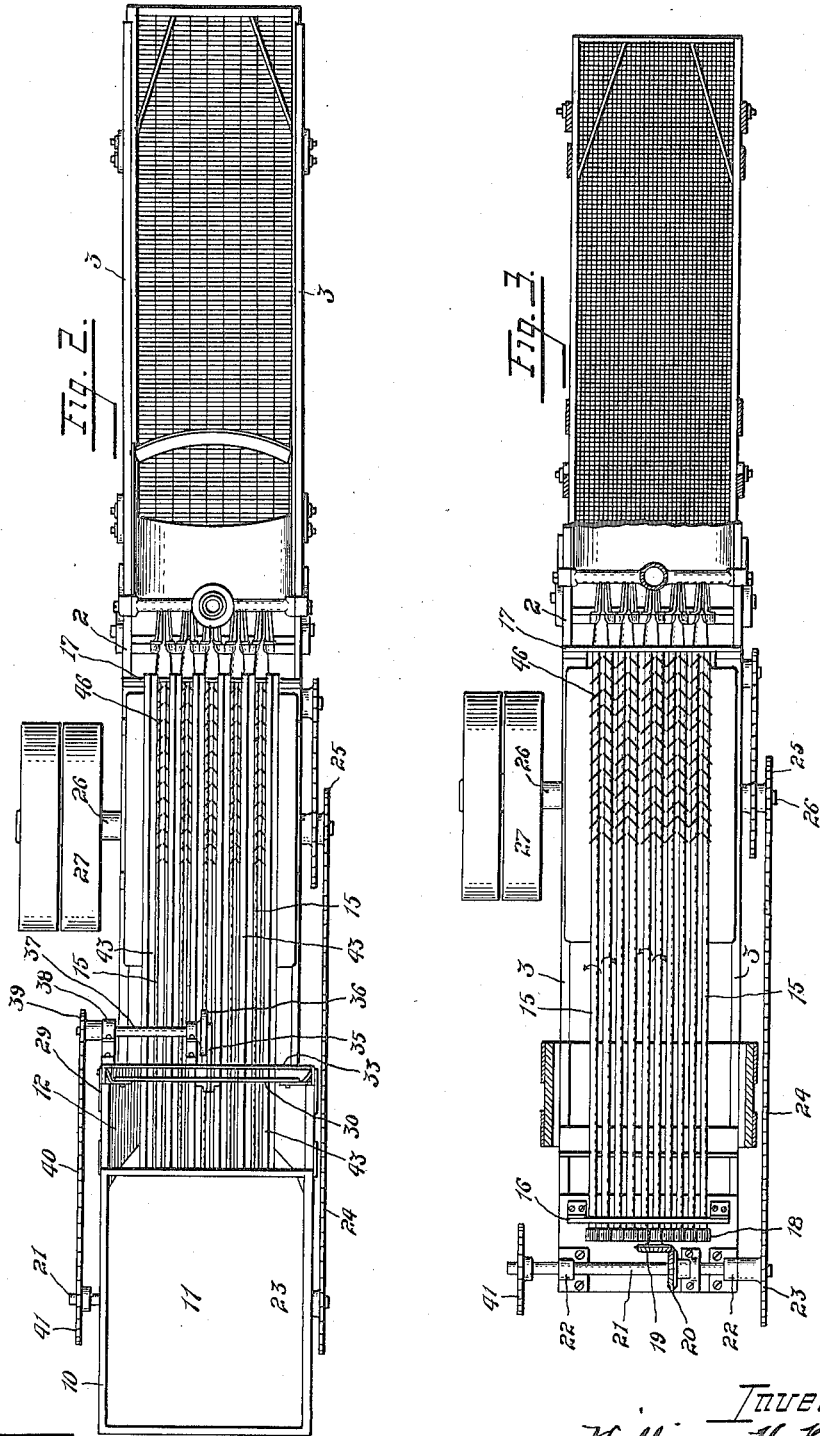

UNITED STATES PATENT OFFICE.

WILLIAM H. KELLY, OF CLEVELAND, OHIO, ASSIGNOR TO THE KELLY COMPANY, A COPARTNERSHIP CONSISTING OF WILLIAM H. KELLY AND LOUIS A. KELLY, OF CLEVELAND, OHIO.

FEEDING MECHANISM FOR NUT-BLANCHING MACHINES.

1,190,554.      Specification of Letters Patent.      Patented July 11, 1916.

Original application filed October 6, 1914, Serial No. 865,224. Divided and this application filed December 11, 1914. Serial No. 876,628.

*To all whom it may concern:*

Be it known that I, WILLIAM H. KELLY, a citizen of the United States, resident of Cleveland, county of Cuyahoga, and State of Ohio, have invented a new and useful Improvement in Feeding Mechanism for Nut-Blanching Machines, of which the following is a specification, the principle of the invention being herein explained and the best mode in which I have contemplated applying that principle, so as to distinguish it from other inventions.

This invention relates to feeding mechanism for nut blanching machines, and particularly to feeding mechanism for machines designed to remove the skins from peanut kernels.

The object of the present invention is to provide a feeding mechanism whereby the peanut kernels are fed without liability of breaking apart the cotyledons making up the peanut kernels and the consequent production of what are known in the trade as "splits."

This application is a division of application No. 865,224, filed by me on October 6, 1914, for a nut blanching machine, and the invention included in the present application relates to a hopper construction with means therein for the agitation of the peanut kernels contained in the hopper, and feeding or conveyer mechanism within and extending from the hopper for the presentation of the peanut kernels in orderly sequence to decorticating or skinning devices, by means of which latter the skin is removed from the kernels, but the decorticating devices do not of themselves form a part of the present invention.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications come within the scope of the appended claims.

In the drawings:—Figure 1 represents a side elevation of a nut-blanching machine embodying my invention. Fig. 2 represents a plan of said machine. Fig. 3 represents a plan, partly in section, showing the hopper removed and disclosing that part of the feeding mechanism beneath same, a part of said hopper being shown in section. Fig. 4 represents a vertical longitudinal section of the hopper and adjacent parts, upon an enlarged scale, and showing a portion only of feeding device. Fig. 5 represents an end view of said hopper and adjacent parts, showing a portion thereof broken away, and a part of the feeding mechanism in transverse section. Fig. 6 represents a longitudinal section of a fragmentary portion of the hopper and adjacent parts. Fig. 7 represents an end view of the modified form of hopper showing part of the feeding mechanism in transverse section. Fig. 8 represents a plan of a fragmentary portion of the hopper and modified form of feeding mechanism.

The seed or kernel of the peanut is an irregularly ovocylindrical dicotyledon with the inner surfaces of the two associated cotyledons approximately flat and in nonadherent contact. The only connection between the two cotyledons is at the radicle end.

The machine of the present invention is designed to operate upon cooked peanuts in contradistinction to green peanuts, and such cooking is performed by roasting, boiling or otherwise treating the peanuts, and when introduced into the feeding mechanism of the present invention the peanut cotyledons are quite hard with the junction at the radicle end quite brittle and the joined cotyledons are inclosed in a brittle envelop or skin.

Because of the character of the peanuts in the condition in which they are introduced into the machine, due consideration must be given in presenting them to the decorticating devices to avoid any such treatment as would be liable to break away the skins and shatter the indifferent and brittle connection at the radicle ends and thereby separating the cotyledons into the form known as "splits."

The commercial demand is decidedly for whole-nut peanuts in preference to those where the cotyledons are broken apart, and hence care must be taken in the handling of the peanuts to present them to the decorticating devices to retain the proper union of the cotyledons and to avoid subjecting them to forces liable to break the cotyledons apart, which forces may prove destructive to the whole-nut condition of the peanuts even though relatively gentle.

The device illustrated and to which my invention is applied, comprises a base-member 1 upon the upper end of which is pivotally mounted an auxiliary frame 2 consisting of the main side bars 3, 3, and suitable transverse members. The trunnions 4 which form the oscillatory mounting for this auxiliary frame are secured to these side bars 3, 3. Suitably secured to this auxiliary frame and depending therefrom, is a second auxiliary frame 5 upon which the driving mechanism is mounted, as will be hereinafter described.

Upon the extreme left-hand of the auxiliary frame 2 is mounted a hopper 10, which is adapted to receive a store of peanut kernels prior to their decortication. This hopper has a downwardly slanting bottom 11 and is provided with a compartment 12 communicating with the main portion of the hopper through an opening 13 constituting a throat of constricted area. Extending through a slot 14, Fig. 5, and into the compartment 12, is a series of cylindrical rods 15 whose upper ends are journaled in a cross-piece 16 forming part of the auxiliary frame 2, as shown in Fig. 3. To the upper end of each such rod is secured a pinion 18, and these pinions mesh with each other as shown in said Fig. 3. The upper end of one of these rods is extended and has secured thereto a bevel pinion 19 which meshes with a second bevel pinion 20, fixedly secured to a transverse shaft 21 mounted in suitable bearings 22 secured to the secondary frame 2. The front end of this shaft has secured thereto a sprocket-wheel 23 from which runs a chain 24 passing through a second sprocket-wheel 25 which is fixed to a transverse shaft 26 mounted upon the depending secondary auxiliary frame, as shown in Fig. 1. This shaft has secured thereon the driving pulley 27 by means of which the main driving shaft 26 is rotated. The rotation of this driving pulley, therefore, will effect the rotation of the rods 15, adjacent rods being rotated in opposite directions, as will be readily understood. These rods are even in number and beginning with the outside pair, each pair thereof forms a runway or guide for the nut-kernels.

Depending from a transverse rod 28, Figs. 1 and 4, which is mounted upon uprights 29 secured to the frame 2, is an oscillatory agitator 20, Figs. 4 and 5. This agitator consists of a main plate 31 secured to the depending rods 32 hung upon the horizontal rod 28. The lower edge-portion of this plate lies normally in substantial line with the upper edge of the slot or opening 14 in the front wall 33 of the compartment 12 of the hopper. This wall is provided with an opening 34 through which extends a link 35, one end of which articulates with the plate 31 and the other end of which articulates with a crank disk 36 secured to shaft 37 transversely mounted upon the wall 33 in suitable bearings 38, 38, secured thereto, as shown in Fig. 5. This shaft extends laterally and has secured thereto a sprocket-wheel 39 from which runs a sprocket-chain 40, Fig. 4, which runs from a second sprocket-wheel 41, secured to the shaft 21 on the end opposite that to which the sprocket-wheel 23 is secured. It will therefore be noted from the above-described construction that the operation of the main driving mechanism, previously described will effect the oscillation of plate 31 in the compartment 12 of the hopper. The driving mechanism from the main or drive shaft to the various parts receiving power therefrom, and especially the rods 15 and the agitator 30, is in the form of sprocket chains and wheels or toothed gearing, so that the parts all move in properly timed relation. This plate 31 is provided with incisions 42 whose central portions are in vertical planes which pass between each pair of rods 15, these incisions being of a size such that they will permit a large-size peanut kernel to pass beneath the same and on to the runway formed by such rods. To further insure the proper location of the kernels upon these guideways, the neighboring members of adjacent pairs of rods are overridden by angle bars 43 each forming a V-shaped guard with the angle uppermost, as shown in Fig. 5. These angle bars extend beneath and from the compartment 12 downwardly to the cross-piece 17 to which their lower ends are suitably secured, their upper ends being suitably secured to a cross-piece 44, Fig. 4. The plate 31 is furthermore provided with incisions 45 of angular form to conform with the shape of the guards or angle bars 43.

When a suitable quantity of peanuts is placed in the hopper 10 and that portion of the machine carrying the hopper, conveyer rods 15 and the decorticating devices toward which the conveyers direct the peanuts, is suitably tilted so that the rods 15 decline from the hopper toward the decorticating devices, peanuts will flow through the opening or throat 13 into the auxiliary compartment of the hopper and would actually so flow by gravity, because of the inclined bottom of the hopper, even though the machine is not so adjusted as to tilt the rods 15 at an angle to the horizontal.

The opening or throat 13 being located at a low point between the main body of the hopper and its auxiliary compartment, which latter is located in the line of flow of peanuts from the hopper to the conveyer rods 15, only a limited quantity of peanuts is directed into the auxiliary compartment at any one time.

The inclined bottom of the hopper stops short of the front or discharge end of the auxiliary compartment, terminating above the rods 15 which underride the auxiliary compartment, and hence such portions of the rods constitute the bottom of the auxiliary compartments from the front end of the bottom of the hopper to the front or discharge end of the auxiliary compartment.

The peanuts which pass through the throat 13 move by gravity along the inclined bottom of the auxiliary compartment composed of rods 15 with the angle guards 43 bridging the spaces between the pairs of associated rods, and finally come to rest against the plate 31 of the agitator 30. The accumulation of peanuts in the auxiliary compartment is, however, small, since the angle of rest for the peanuts flowing out of the hopper being determined by the upper edge of the opening 13 may terminate on the hopper side of the plate 31, wherefore the layer of peanuts directed against the plate need not be over two or three deep.

The spacing of the rods 15 of each pair is such as to be less than the length of the peanuts and also less than the width thereof, wherefore peanuts of the minimum size for which the machine is intended will not drop through the spaces between the rods of each pair.

During the operation of the machine the rods are rotated with those of each pair turning in opposite directions, but toward each other, and the agitator plate is at the same time caused to reciprocate or rock on its pivotal support away from and toward the front wall 33 of the auxiliary compartment 12. Such rocking movements whereby the lower edge of the plate 31 moves immediately above the rods 15 in the direction of the length of these rods, is a relatively slow movement, say, about two oscillations for each complete rotation of a rod 15. The relatively small mass of peanuts within the compartment 12 is, therefore, subjected to gentle agitation in the general direction of the flow of peanuts from the hopper into the compartment and out of the compartment. This results because of the V-shaped guards, the round rods 15 and the notched lower edge of the agitator plate in distributing the peanuts lengthwise of the rods, in which position they flow by gravity along the rods under the agitator plate and beneath the front plate 33 through the slot 14 without impediment, and continue their movement under the action of gravity along the rods.

The quantity of peanuts at any one time within the compartment 12 is so small and the rocking of the agitator plate is so deliberate that the peanuts are effectively distributed and alined with respect to the rods 15, so as to flow along the latter to the exterior of the compartment 12 without in any manner injuring the peanuts or bringing forces to bear upon them of such degrees or in such directions as to be liable to separate or slide the cotyledons of the peanut kernels upon each other to an extent shattering the connection at the radicle end. With the conveyer rods 15 tilted at a suitable angle and rotating toward each other, the peanuts are supported upon moving inclined surfaces with the movement of the inclined surfaces toward each other and transverse to the length of the peanuts and of said surfaces, so that the peanuts readily gravitate along the rods supporting them away from the compartment 12.

The lower portion of each rod 15 is provided with a helical land or rib 46, the trend of the lands of the members of each pair of rods being opposite, as shown. The rods of each pair being, as previously described, rotated in opposite directions, it will be seen that after the nut-kernels have passed down the guide-ways by gravity, they finally reach the helical groove formed by the associated helical lands, and are from that point on fed downwardly by positively acting means. Such down and positive feeding is continued until the kernels are discharged from the ends of the guide-ways formed by these rods, after which they are subjected to the decorticating operation, as fully described in my said above-mentioned original application.

The purpose of the associated helical lands or ribs 46 at the lower ends of each coacting pair of rods or conveyers 15 is to positively separate the oncoming peanuts, whereby they are positively fed one by one to the decorticating means, such as described in the aforesaid original application, and as also shown and described in the application of William W. Kelly, No. 860,079, for nut blanching machine, filed September 3, 1914.

The above-described structure may be modified as indicated in Figs. 6, 7 and 8. Such modification consists in the elimination of the agitator 30 and the extension of the helical lands 46 along the rods 15, so as to project into the compartment 12 of the hopper.

In the operation of this modified structure, the nuts in the bottom portion of the compartment 12 are engaged by the rotating helical lands and carried out under the wall 33, their subsequent travel downwardly toward the decorticating device being consequently independent of gravitation. In this respect it differs from the first-described device in that the latter requires the coöp- eration of gravity to feed the nuts from the vicinity of the wall 33 down to the point at which the helical lands begin.

Having fully described my invention, what I claim and desire to secure by Letters Patents is:—

1. In a machine for treating peanuts, a receptacle for the peanuts provided with an outlet opening, agitating means within the receptacle for the peanuts and movable toward and from the discharge opening, and peanut supporting means associated with the agitator and below the latter and forming the bottom of the receptacle, the agitator and last-named means being in coactive relation for alining the peanuts within the receptacle and said last-named means discharging the peanuts from the receptacle while they are in the alined condition.

2. In a machine for treating peanuts, a hopper having a main compartment and an auxiliary compartment into which the main compartment discharges, said auxiliary compartment having an outlet on the opposite side from where it communicates with the main compartment, a reciprocatory agitator for the peanuts located in the auxiliary compartment, and means at the bottom portion of the auxiliary compartment in coactive relation to the agitator for alining the peanuts while in the auxiliary compartment and directing them through the outlet of said auxiliary compartment in the alined condition.

3. In a machine for treating peanuts, a receptacle for the peanuts from which the peanuts are discharged, a reciprocatory agitator for the peanuts located in said receptacle adjacent to the outlet thereof, with the agitator movable toward and from said outlet in close spaced relation to the bottom of the receptacle, and means located at and constituting the bottom of the receptacle and leading therefrom for conveying the peanuts from said receptacle, the last-named means and the agitator where adjacent thereto being coactively formed to aline the peanuts and prevent them from issuing from the receptacle in a stream of alined peanuts of more than one-peanut depth.

4. In a machine for treating peanuts, a hopper provided with a main compartment and an auxiliary compartment into which the main compartment discharges, with the auxiliary compartment having a restricted outlet through the side thereof remote from the main compartment, an agitator in the auxiliary compartment adjacent to the outlet side thereof and mounted to reciprocate toward and from said outlet side closely adjacent to the bottom of said compartment, and means coacting with the agitator whereby peanuts delivered into the auxiliary compartment are alined and caused to move from the auxiliary compartment in a shallow restricted stream while in the alined condition.

5. In a machine for treating peanuts, a hopper having a main compartment and an auxiliary compartment in communication with the main compartment of the hopper and into which the main compartment discharges, conveyer means for the peanuts located at the bottom portion of and within the area there defined by the auxiliary compartment and leading therefrom, and an agitator for the peanuts within the auxiliary compartment and in coactive relation to the conveyer means whereby the peanuts are alined on the conveyer means and discharged from the auxiliary compartment by said conveyer means while in the alined condition.

6. In a machine for treating peanuts, a hopper having a main compartment and an auxiliary compartment in communication with the main compartment of the hopper and into which the main compartment discharges, conveyer means for the peanuts located at the bottom portion of and within the area there defined by the auxiliary compartment and leading therefrom, and an agitator for the peanuts within the auxiliary compartment, said agitator comprising a reciprocatory member and provided with means for reciprocating said member in the direction of movement of the peanuts along the conveyer means and out of the auxiliary compartment.

7. In a machine for treating peanuts, a receptacle for the peanuts, conveyers for the peanuts leading from the receptacle and also providing a series of runways constituting the peanut receiving and sustaining bottom of the receptacle, means for causing a restricted flow of peanuts into said receptacle onto the conveyers therein, and means in the receptacle for distributing the peanuts in alinement lengthwise of the runways for the discharge of the peanuts from the receptacle in the alined condition by said runways.

8. In a machine for treating peanuts, a receptacle for peanuts, elongated conveyers spaced apart transversely of the length of the conveyers and constituting the peanut receiving and sustaining bottom of the receptacle, means for directing a restricted flow of peanuts into the receptacle on to the conveyers, and an agitator within the receptacle for alining the peanuts on said conveyers, said agitator being in coactive relation to the conveyers and located at that end of the receptacle remote from the means for directing the restricted flow of peanuts into the receptacle.

9. In a machine for treating peanuts, a receptacle for peanuts having means for supplying the peanuts to the receptacle in restricted quantities, pairs of oppositely rotatable rods located at the bottom of the receptacle and constituting a support and discharge means for the peanuts delivered to the receptacle, and a reciprocatory agitator movable within the receptacle in a direction longitudinal to the rods.

10. In a machine for treating peanuts, a hopper provided with a slanting bottom and a discharge opening at the lower end of the bottom of the hopper, an auxiliary compartment communicating with the hopper through the discharge opening, conveyers within the auxiliary compartment and leading therefrom and in position to receive peanuts from the hopper through the opening by which the hopper communicates with the auxiliary compartment, and a reciprocable agitator in the auxiliary compartment provided with means for moving it lengthwise of the conveyers.

11. In a machine for treating peanuts, a compartment for receiving peanuts, means for directing peanuts in restricted quantities into said compartment, conveyers within the compartment at the bottom thereof and leading therefrom for directing peanuts from the compartment, and an agitator within the compartment comprising a reciprocable plate and means for reciprocating the plate in the direction of the length of the conveyers.

12. In a machine for treating peanuts, a compartment for receiving peanuts, conveyers at the bottom portion of the compartment and leading therefrom and comprising a series of pairs of oppositely rotatable rods, and an agitator within the compartment movable lengthwise of the latter and extending transversely of the rods adjacent to that end of the compartment from which the conveyers lead.

13. In a machine for treating peanuts, a compartment for receiving peanuts, means for directing peanuts into said compartment, conveyers within and leading from the compartment and comprising a series of pairs of oppositely rotatable rods, and an agitator within the compartment in the form of a plate extending transversely of the rods and movable lengthwise thereof.

14. In a machine for treating peanuts, a compartment for receiving peanuts, means for directing peanuts into said compartment, conveyers within and leading from the compartment and comprising a series of pairs of oppositely rotatable rods, and an agitator comprising a pendently hung plate extending transversely of the rods within the compartment, and provided with means for imparting reciprocatory movements to the plate in the direction of the length of the rods.

15. In a machine for treating peanuts, a receptacle for peanuts, a series of pairs of oppositely rotatable rods arranged at the bottom of the receptacle and leading therefrom, guards within the compartment overriding the adjacent members of each pair of rods, and an agitator within the compartment in the form of a reciprocable pendently hung plate having its lower edge adjacent to the rods and guards and provided with means for reciprocating it in the direction of the length of the rods and guards.

16. In a machine for treating peanuts, a receptacle for peanuts, a series of pairs of oppositely rotatable rods arranged at the bottom of the receptacle and leading therefrom, guards within the compartment overriding the adjacent members of each pair of rods, and an agitator within the compartment in the form of a reciprocable pendently hung plate having its lower edge adjacent to the rods and guards and provided with means for reciprocating it in the direction of the length of the rods and guards, the bottom of the agitator plate and that wall of the compartment through which the rods extend being notched in matching relation to the spaces between the pairs of rods to form in conjunction with the rods outlets for peanuts disposed lengthwise of and carried by the rods.

17. In a peanut treating machine, a hopper for containing and delivering peanuts, rotatable feeding rods closer together than the thickness of the peanuts to be fed by the rods and located within and extending from the hopper and where within the hopper constituting means for receiving and supporting peanuts and a reciprocable agitator in the hopper in coactive relation to the rods where within the hopper to aline the peanuts on the rods for discharge from the hopper in the alined condition.

18. In a peanut treating machine, a hopper structure for containing and delivering peanuts, and conveyer means for directing the peanuts from the hopper structure, comprising a series of pairs of oppositely rotatable rods entering and forming a portion of the hopper structure, said rods each being of smooth cylindrical conformation throughout the greater portion of its length and where within the hopper, and at the ends remote from the hopper both rods of each pair having means for engaging and positively actuating the peanuts lengthwise of the rods.

19. In a peanut treating machine, a hopper structure for containing and delivering peanuts, and conveyer means for directing the peanuts from the hopper structure comprising series of pairs of oppositely rotatable rods entering and forming a part of the hopper structure, said rods having smooth exteriors within the limits of the hopper structure and for a portion of their length outside said hopper structure and at the ends remote from the hopper structure provided with matching helical ribs, with the trend of the ribs of each pair opposite one to the other and the turns of the ribs spaced apart in the direction of the length of the rods sufficiently to receive single peanut kernels between them.

20. In a peanut treating machine, a hopper structure for containing and delivering peanuts, and conveyer means for directing the peanuts from the hopper structure comprising a series of pairs of oppositely rotatable rods entering and forming a portion of the hopper structure, said rods each being of smooth cylindrical conformation throughout the greater portion of its length and where within the hopper, and said rods at the ends remote from the hopper being provided with matching helical ribs or lands with the ribs of one rod of each pair of opposite trend to that of the companion rod of the pair.

21. In a peanut treating machine, a hopper structure for containing and delivering peanuts, and conveyer means for directing the peanuts from the hopper structure comprising a series of pairs of oppositely rotatable rods entering and forming a portion of the hopper structure, said rods each being of smooth cylindrical conformation throughout the greater portion of its length and where within the hopper, and said rods at the ends remote from the hopper being provided with matching helical ribs or lands with the rib of one rod of each pair of opposite trend to that of the companion rods of the pair, the ribs having their turns spaced apart lengthwise of the rods by substantially the maximum lengths of the peanut kernels to be treated.

22. In a peanut treating machine, means for feeding peanuts comprising a hopper with a slanting bottom and provided with an auxiliary compartment communicating with the hopper at the lower end of the slanting bottom, said compartment having an outlet opening in the wall remote from the point of communication with the hopper, conveyers within the auxiliary compartment and constituting the bottom portion of said auxiliary compartment, said conveyers comprising pairs of rods substantially in parallelism with each other and extending out of the compartment through the opening in the wall thereof opposite the inlet to the compartment, and an agitator within the auxiliary compartment comprising a pendently hung reciprocatory plate with its lower edge close to the conveyer rods and notched where overriding the spaces between the rods of each pair with that wall of the compartment through which the rods extend similarly notched, and means for reciprocating the plate in the direction of the length of the rods.

23. In a machine for treating peanuts, a feeding means for the peanuts comprising a hopper structure having conveyers in the form of pairs of oppositely rotatable associated rods constituting the peanut sustaining bottom of the hopper structure and also extending from the hopper structure and at the ends remote from the hopper structure provided with matching helical lands or ribs, and guards within the hopper structure bridging the spaces between the neighboring rods of adjacent pairs.

24. In a machine for treating peanuts, a feeding means for the peanuts comprising a hopper structure having conveyers in the form of pairs of oppositely rotatable associated rods constituting the peanut sustaining bottom of the hopper structure and also extending from the hopper structure and at the ends remote from the hopper structure provided with matching helical lands or ribs, and guards within the hopper structure bridging the spaces between the neighboring rods of adjacent pairs, said guards being of inverted V-shape and extending lengthwise of the rods.

25. In a machine for treating peanuts, a feeding means for the peanuts comprising a hopper structure with a slanting bottom and provided with an auxiliary compartment with a communicating passage between the hopper and the auxiliary compartment at the bottom portion of each to cause a restricted flow of peanuts from the hopper to the auxiliary compartment, slanting oppositely rotatable rods arranged in pairs with each pair forming a conveyer and said rods forming the bottom portion of the auxiliary compartment and extending therefrom beyond and constituting the discharge means for the auxiliary compartment, the rods of each pair being provided at the lower ends with matching helical ribs or lands with the rib of one rod of a pair of opposite trend to that of the other rod of the same pair, and an agitator in the auxiliary compartment extending transversely of the rods and reciprocable lengthwise of the rods, to lay the peanuts in the conveyers in alinement therewith.

26. In a machine for treating peanuts, a hopper, coacting rotatable rods in the hopper and extending therefrom to receive, aline and direct the alined peanuts from the hopper, said hopper having outlets coactively related to the rods to allow but one peanut at a time to pass through an outlet, and an agitator within the hopper in coactive relation to the rods to distribute the peanuts over the rods.

27. In a machine for treating peanuts, a hopper, pairs of rotatable rods within and leading from the hopper with the rods of each pair associated to receive and support the peanuts deposited thereon and direct the peanuts from the hopper, said hopper having outlets, one for each pair of rods, and each of a size to allow but one peanut at a time to pass therethrough, and an agitator within the hopper in coactive relation to the rods and to the outlets of the hopper and shaped adjacent to the rods to provide passages for the peanuts to allow but one peanut at a time to pass, the agitator and rods coacting to aline the peanuts for discharge from the hopper in the alined condition.

28. In a machine for treating peanuts, a hopper provided with a main compartment and an auxiliary compartment into which latter a limited mass of peanuts is discharged from the main compartment, an agitator in the auxiliary compartment acting upon the body of peanuts therein, and alining rods at and constituting the peanut supporting bottom of the auxiliary compartment, said agitator with the rods serving to aline the peanuts in a stream of one-peanut depth, and the auxiliary compartment having outlets restricting the passage of peanuts through each to one peanut at a time with the peanuts in the alined condition.

Signed by me, this 5th day of December, 1914.

WILLIAM H. KELLY.

Attested by—
 HERMAN EISELE,
 D. FINDLING.